United States Patent
Kurahashi

(10) Patent No.: US 10,075,686 B2
(45) Date of Patent: Sep. 11, 2018

(54) COLOR-IMAGE-DATA CONTAMINATION CORRECTION DEVICE AND IMAGING DEVICE, AND METHOD FOR CONTROLLING OPERATION THEREOF

(71) Applicant: FUJIFILM Corporation, Tokyo (JP)

(72) Inventor: Hidekazu Kurahashi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 18 days.

(21) Appl. No.: 14/939,187

(22) Filed: Nov. 12, 2015

(65) Prior Publication Data

US 2016/0073077 A1 Mar. 10, 2016

Related U.S. Application Data

(63) Continuation of application No. PCT/JP2014/061454, filed on Apr. 23, 2014.

(30) Foreign Application Priority Data

May 13, 2013 (JP) ................................ 2013-100982

(51) Int. Cl.
*H04N 5/347* (2011.01)
*H04N 5/359* (2011.01)
(Continued)

(52) U.S. Cl.
CPC .............. *H04N 9/646* (2013.01); *G06T 5/001* (2013.01); *G06T 5/20* (2013.01); *H04N 5/347* (2013.01); *H04N 5/359* (2013.01); *H04N 9/045* (2013.01); *G06T 2207/10024* (2013.01)

(58) Field of Classification Search
CPC ........ H04N 5/347; H04N 5/359; H04N 9/045; H04N 9/646; G06T 5/001; G06T 5/002
See application file for complete search history.

(56) References Cited

U.S. PATENT DOCUMENTS

| 8,970,741 B2* | 3/2015 | Yamashita | H04N 5/23209 348/241 |
| 2010/0134660 A1* | 6/2010 | Yamauchi | H04N 9/045 348/247 |

(Continued)

FOREIGN PATENT DOCUMENTS

| JP | 2004-135206 A | 4/2004 |
| JP | 2009-105488 A | 5/2009 |

(Continued)

OTHER PUBLICATIONS

International Search Report for PCT/JP2014/061454 dated Aug. 5, 2014.

(Continued)

*Primary Examiner* — Daniel M Pasiewicz
(74) *Attorney, Agent, or Firm* — Birch, Stewart, Kolasch & Birch, LLP

(57) ABSTRACT

The deterioration of image quality due to the mixture of light during pixel mixture is prevented. A filter that transmits a green light component is formed on a light receiving surface of a photoelectric conversion element and a filter that transmits a red light component is formed on a light receiving surface of a photoelectric conversion element. Light which is vertically incident on the filter is incident on the corresponding photoelectric conversion element. However, light which is obliquely incident on the filter is mixed with a photoelectric conversion element adjacent to the corresponding photoelectric conversion element. When pixel mixture is performed, mixed pixel data is reduced from the data of a mixed pixel to perform mixture correction.

7 Claims, 13 Drawing Sheets

(51) Int. Cl.
    *H04N 9/04*     (2006.01)
    *H04N 9/64*     (2006.01)
    *G06T 5/00*     (2006.01)
    *G06T 5/20*     (2006.01)

(56) References Cited

U.S. PATENT DOCUMENTS

| | | | |
|---|---|---|---|
| 2012/0098975 A1* | 4/2012 | Chao | H04N 5/3572 348/187 |
| 2012/0194720 A1* | 8/2012 | Bowers | H04N 5/3458 348/302 |
| 2012/0293681 A1 | 11/2012 | Yamauchi | |
| 2013/0032694 A1* | 2/2013 | Nakata | H04N 5/359 250/208.1 |
| 2013/0293750 A1 | 11/2013 | Tanaka | |
| 2014/0307122 A1* | 10/2014 | Hayashi | H04N 9/07 348/223.1 |
| 2015/0229832 A1* | 8/2015 | Itano | H04N 5/3458 348/295 |

FOREIGN PATENT DOCUMENTS

| | | |
|---|---|---|
| JP | 2010-130583 A | 6/2010 |
| JP | 2013-5363 A | 1/2013 |
| WO | WO 2012/124184 A1 | 9/2012 |

OTHER PUBLICATIONS

Written Opinion of the International Searching Authority for PCT/JP2014/061454 dated Aug. 5, 2014.

\* cited by examiner

FIG. 26

| R | G(1) | R |
|---|---|---|
| G(1) | B | G(1) |
| R | G(1) | R |

| G(1) | R | G(1) |
|---|---|---|
| B | G(4) | B |
| G(1) | R | G(1) |

| G(1) | B | G(1) |
|---|---|---|
| R | G(4) | R |
| G(1) | B | G(1) |

| G(1) | B | G(1) |
|---|---|---|
| R | G(2) | R |
| G(1) | B | G(1) |

~51A

COLOR-IMAGE-DATA CONTAMINATION CORRECTION DEVICE AND IMAGING DEVICE, AND METHOD FOR CONTROLLING OPERATION THEREOF

CROSS-REFERENCE TO RELATED APPLICATIONS

This application is a Continuation of PCT International Application No. PCT/JP2014/061454 filed on Apr. 23, 2014, which claims priority under 35 U.S.C. § 119(a) to Japanese Patent Application No. 2013-100982 filed May 13, 2013. Each of the above application(s) is hereby expressly incorporated by reference, in its entirety, into the present application.

BACKGROUND OF THE INVENTION

1. Field of the Invention

The present invention relates to a color image data mixture correction device, an imaging apparatus, a method for controlling the operation thereof, and a program for controlling a computer of a color image data mixture correction device.

2. Description of the Related Art

With an increase in the number of pixels of a solid-state electronic imaging device, the distance between photodiodes forming the solid-state electronic imaging device has been reduced. Therefore, in some cases, light which will be incident on a photodiode provided at a given position is mixed with a photodiode adjacent to the photodiode. In this case, it is difficult to accurately reproduce colors.

There is a technique which corrects color mixture caused during a read process even when pixels are mixed (JP2009-105488A). In addition, there is a technique which reduces pixel unevenness caused by the leakage of light (JP2004-135206A).

SUMMARY OF THE INVENTION

In the technique disclosed in JP2009-105488A, correction for the mixture of light incident on the photodiodes is not considered. In the technique disclosed in JP2004-135206A, correction for the mixture of light incident on the photodiodes when the pixels are mixed is not considered.

An object of the invention is to prevent deterioration of image quality caused by the mixture of light when pixels are mixed.

According to a first aspect of the invention, there is provided a color image data mixture correction device including: a same-color pixel data mixture device (same-color pixel data mixture means) for mixing data of pixels of the same color which are included in a pixel block including a plurality of original pixels among a large number of original pixels forming a color image in color image data indicating the color image that is obtained by a single solid-state electronic imaging device, in which a plurality of photoelectric conversion elements having light receiving surfaces on which color filters with different filter characteristics are periodically formed in a repetitive pattern are arranged, to obtain reduced color image data; and a mixture correction device {mixture (color mixture) correction means} for performing correction such that the amount of data mixed (color mixture; the mixture of the data of pixels of the same color is also considered as color mixture) with data of the original pixels generating a mixed pixel is reduced from the amount of mixed pixel data which indicates each of a plurality of mixed pixels forming a reduced color image indicated by the reduced color image data obtained by the same-color pixel data mixture device.

The first aspect of the invention provides an operation control method suitable for the color image data mixture correction device. That is, this method includes: allowing a same-color pixel data mixture device to mix data of pixels of the same color which are included in a pixel block including a plurality of original pixels among a large number of original pixels forming a color image in color image data indicating the color image that is obtained by a single solid-state electronic imaging device, in which a plurality of photoelectric conversion elements having light receiving surfaces on which color filters with different filter characteristics are periodically formed in a repetitive pattern are arranged, thereby obtaining reduced color image data; and allowing a mixture correction device to perform correction such that the amount of data mixed with data of the original pixels generating a mixed pixel is reduced from the amount of mixed pixel data which indicates each of a plurality of mixed pixels forming a reduced color image indicated by the reduced color image data obtained by the same-color pixel data mixture device.

The first aspect of the invention also provides a recording medium storing a computer-readable program that causes a computer to perform a method for controlling an operation of a color image data mixture correction device.

According to the first aspect of the invention, a plurality of photoelectric conversion elements are arranged in the single solid-state electronic imaging device. The color filters with different filter characteristics are periodically formed on the light receiving surfaces of the photoelectric conversion element in a repetitive pattern. The color image data indicating the color image is obtained from the solid-state electronic imaging device. The data of the pixels of the same color which are included in the pixel block including a plurality of original pixels among a large number of original pixels forming the color image is mixed. Then, the reduced color image data with a small amount of data is obtained. Correction is performed such that data mixed with the data of the original pixels generating the mixed pixel is reduced from the mixed pixel data which indicates each of the plurality of mixed pixels forming the reduced color image (the correction may be performed by subtraction or the multiplication of the mixed pixel data by a rate corresponding to a mixture rate). It is possible to correct the mixture of light components to be incident on adjacent photoelectric conversion elements while generating reduced color image data using pixel mixture.

When the size of the pixel block is different from a size defined by the repetitive pattern cycle of the color filters, for example, the amount of mixed data which is reduced from the amount of data of the mixed pixel varies depending on the color pattern of the original pixels generating the mixed pixel in the pixel block (the distribution pattern of color components in the color image indicated by the original pixels or the distribution pattern of the original pixels for each color component in the color image).

When the same-color pixel data mixture device repeatedly performs pixel mixture for each pixel block in the color image data, an enlarged pixel block including 2×2 pixel blocks which are adjacent to each other in a horizontal direction and a vertical direction may include at least two pixel blocks having the same color filter array.

For example, the same-color pixel data mixture device weights the data of the pixels of the same color such that the same amount of data is reduced from the mixed pixel data indicating the pixels of the same color in the pixel block and mixes the weighted data of the pixels of the same color.

For example, the color filters are formed on the light receiving surfaces of the photoelectric conversion elements in a Bayer array and the pixel block includes three pixels in the horizontal direction and three pixels in the vertical direction.

At least one first filter with characteristics that transmit a green or magenta light component, at least one second filter with characteristics that transmit a red or cyan light component, and at least one third filter with characteristics that transmit a blue or yellow light component may be formed in the horizontal direction and the vertical direction on the light receiving surfaces of 6×6 photoelectric conversion elements in the horizontal direction and the vertical direction. At least one first filter may be formed in the horizontal direction, the vertical direction, and an oblique direction and two consecutive first filters may be formed in at least one of the horizontal direction, the vertical direction, and the oblique direction. The pixel block may include three pixels in the horizontal direction and three pixels in the vertical direction.

According to a second aspect of the invention, there is provided an imaging apparatus including: a single solid-state electronic imaging device in which a plurality of photoelectric conversion elements having light receiving surfaces on which color filters with different filter characteristics are formed in a repetitive pattern cycle are arranged and which outputs color image data indicating an object image; imaging lenses that form the object image on the light receiving surfaces of the solid-state electronic imaging devices; a same-color pixel data mixture device (same-color pixel data mixture means) for mixing data of pixels of the same color which are included in a pixel block including a plurality of original pixels among a large number of original pixels forming the color image in the color image data indicating the color image that is output from the solid-state electronic imaging device to obtain reduced color image data; and a mixture correction device (mixture correction means) for performing correction such that the amount of data mixed with data of the original pixels generating a mixed pixel is reduced from the amount of mixed pixel data which indicates each of a plurality of mixed pixels forming a reduced color image indicated by the reduced color image data obtained by the same-color pixel data mixture device.

The second aspect of the invention also provides an operation control method suitable for the imaging apparatus. That is, this method includes: allowing a solid-state electronic imaging device, in which a plurality of photoelectric conversion elements having light receiving surfaces on which color filters with different filter characteristics are formed in a repetitive pattern cycle are arranged, to output color image data indicating an object image; allowing same-color pixel data mixture device to mix data of pixels of the same color which are included in a pixel block including a plurality of original pixels among a large number of original pixels forming a color image in the color image data indicating the color image that is output from the solid-state electronic imaging device to obtain reduced color image data; and allowing mixture correction device to perform correction such that the amount of data mixed with data of the original pixels generating a mixed pixel is reduced from the amount of mixed pixel data which indicates each of a plurality of mixed pixels forming a reduced color image indicated by the reduced color image data obtained by the same-color pixel data mixture means.

Similarly to the first aspect, in the second aspect, it is possible to correct the mixture of light components to be incident on adjacent photoelectric conversion elements while generating reduced color image data using pixel mixture.

According to a third aspect of the invention, there is provided an imaging apparatus including: a single solid-state electronic imaging device in which a plurality of photoelectric conversion elements having light receiving surfaces on which color filters with different filter characteristics are formed in a repetitive pattern cycle are arranged and which outputs color image data indicating an object image; a same-color pixel data mixture device (same-color pixel data mixture means) for mixing data of pixels of the same color which are included in a pixel block including a plurality of original pixels among a large number of original pixels forming a color image in the color image data indicating the color image that is output from the solid-state electronic imaging device to obtain reduced color image data; a determination device (determination means) for determining the amount of data mixed with data of the original pixels generating a mixed pixel, on the basis of information of an interchangeable lens (an interchangeable lens which is detachably mounted on the imaging apparatus) that forms the object image on the light receiving surface of the solid-state electronic imaging device; and a mixture correction device (mixture correction means) for performing correction such that the amount of data determined by the determination means is reduced from the amount of mixed pixel data which indicates each of a plurality of mixed pixels forming a reduced color image indicated by the reduced color image data obtained by the same-color pixel data mixture device.

The third aspect also provides an operation control method suitable for the imaging apparatus. That is, this method includes: allowing a solid-state electronic imaging device, in which a plurality of photoelectric conversion elements having light receiving surfaces on which color filters with different filter characteristics are formed in a repetitive pattern cycle are arranged, to output color image data indicating an object image; allowing same-color pixel data mixture device to mix data of pixels of the same color which are included in a pixel block including a plurality of original pixels among a large number of original pixels forming a color image in the color image data indicating the color image that is output from the solid-state electronic imaging device to obtain reduced color image data; allowing determination device to determine the amount of data mixed with data of the original pixels generating a mixed pixel, on the basis of information of an interchangeable lens that forms the object image on the light receiving surface of the solid-state electronic imaging device; and allowing mixture correction device to perform correction such that the amount of data determined by the determination device is reduced from mixed pixel data which indicates each of a plurality of mixed pixels forming a reduced color image indicated by the reduced color image data obtained by the same-color pixel data mixture devices.

According to the third aspect, the interchangeable lens can be detachably mounted on the imaging apparatus. When the interchangeable lens is mounted on the imaging apparatus, lens information is read from the mounted interchangeable lens. The amount of data mixed with the data of the original pixels generating the mixed pixel is determined on the basis of the read lens information. Correction is performed such that the determined amount of data is reduced from the amount of mixed pixel data which indicates each of the plurality of mixed pixels forming the reduced color image. The amount of data to be mixed varies depending on the type of interchangeable lens and the specifications of the interchangeable lens. The amount of data to be mixed is determined according to the information of the interchangeable lens and correction is performed such that the determined amount of data is reduced from the amount of mixed pixel data. Therefore, it is possible to relatively accurately correct the mixed data.

BRIEF DESCRIPTION OF THE DRAWINGS

FIG. 26 illustrates an image portion of the object image.
FIG. 27 illustrates an image portion of the object image.
FIG. 28 illustrates an image portion of the object image.
FIG. 29 illustrates an image portion of the object image.

DESCRIPTION OF THE PREFERRED EMBODIMENTS

Figure 1:
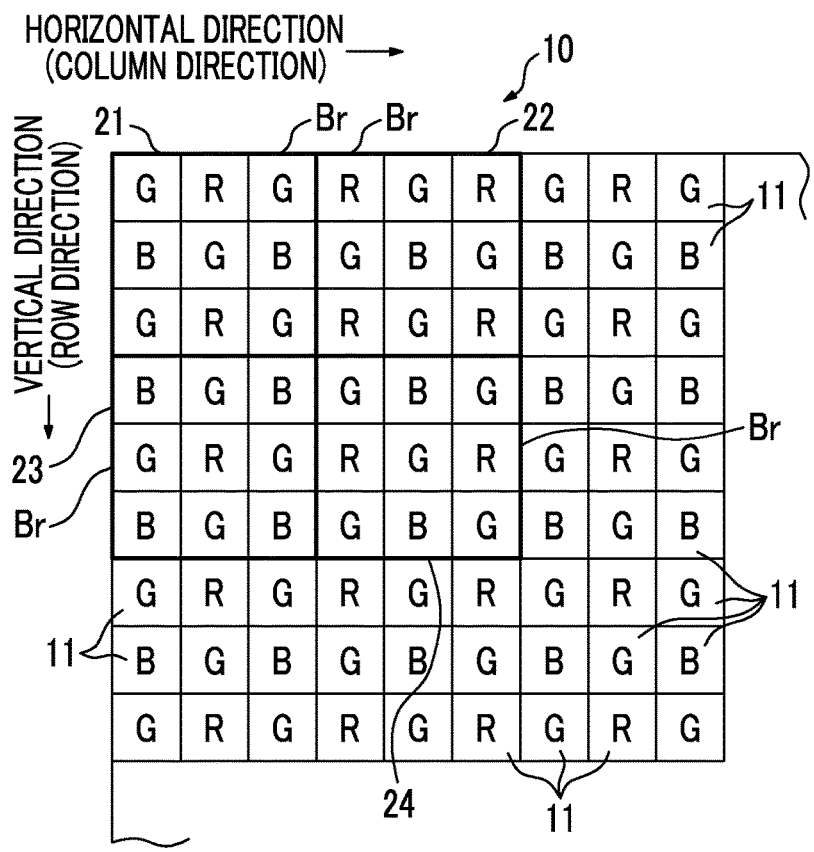
FIG. 1 illustrates a portion of an imaging device.

FIG. 1 illustrates a light receiving surface of a solid-state electronic imaging device 10.

The solid-state electronic imaging device 10 includes a plurality of photoelectric conversion elements 11 which are arranged in the horizontal direction and the vertical direction. A complementary metal oxide semiconductor (CMOS) image sensor is preferably used as the solid-state electronic imaging device 10. Any one of a red filter (represented by letter R) having filter characteristics which transmit a red light component among three primary colors, that is, red, green, and blue, a green filter (represented by letter G) having filter characteristics which transmit a green light component, and a blue filter (represented by letter B) having filter characteristics which transmit a blue light component is formed on a light receiving surface of the photoelectric conversion element 11.

The color filters are arranged in a so-called Bayer array on the photoelectric conversion elements 11 illustrated in FIG. 1. The red filter R is formed on the light receiving surface of the photoelectric conversion element 11 in the odd-numbered row and the even-numbered column. The blue filter B is formed on the light receiving surface of the photoelectric conversion element 11 in the even-numbered row and the odd-numbered column. The green filter G is formed on the light receiving surface of the photoelectric conversion element 11 in the odd-numbered row and the odd-numbered column and in the even-numbered row and the even-numbered column.

A signal charge indicating the red light component is stored in the photoelectric conversion element 11 in which the red filter R is formed. A signal charge indicating the green light component is stored in the photoelectric conversion element 11 in which the green filter G is formed. A signal charge indicating the blue light component is stored in the photoelectric conversion element 11 in which the blue filter B is formed. The stored signal charge is read from the solid-state electronic imaging device 10 and color image data indicating an object image is obtained. The photoelectric conversion element 11 in which the filter R, G, or B is formed corresponds to a pixel forming the object image obtained by the solid-state electronic imaging device 10. Therefore, in the specification, the photoelectric conversion element 11 in which the filter R, G, or B is formed is appropriately referred to as a pixel R, G, or B.

In the above-mentioned example, the red filter R, the green filter C, or the blue filter B is formed on the light receiving surface of the photoelectric conversion element 11. However, a cyan filter having filter characteristics that transmit a light component of cyan C, a magenta filter having filter characteristics that transmit a light component of magenta M, and a yellow filter having filter characteristics that transmit a light component of yellow Y may be formed in the Bayer array. Here, the cyan C, the magenta M, and the yellow Y are complementary colors of the three primary colors.

In this embodiment, a pixel block Br including nine photoelectric conversion elements (pixels) 11, that is, three pixels×three pixels in the horizontal direction and the vertical direction, is defined. The pixel block Br may not be necessarily formed by nine photoelectric conversion elements 11, that is, three pixels×three pixels in the horizontal direction and the vertical direction. Specifically, signal charges (original pixels) which are stored in the nine photoelectric conversion elements 11 included in the pixel block Br are mixed for the same color in the pixel block Br formed by a plurality of original pixels (pixel mixture) to generate reduced color image data, which will be described below.

In the example illustrated in FIG. 1, in a Bayer array in which the repetitive pattern of color filters with a size of two pixels×two pixels is periodically formed, the pixel block Br with a size of three pixels×three pixels is defined. The arrangement of the color filters in the pixel block Br varies depending on the position of the pixel block Br which is represented by reference numeral 21, 22, 23, or 24. When the pixel block Br (referred to as an image portion 21) is located at the position represented by reference numeral 21, the green filters G are formed at the center and four corners, the blue filters B are formed on the left and right sides of the center, and the red filters R are formed on the upper and lower sides of the center. When the pixel block Br (referred to as an image portion 22) is located at the position represented by reference numeral 22, the blue filter B is formed at the center, the red filters R are formed at four corners, and the green filters G are formed in the other regions. When the pixel block Br (referred to as an image portion 23) is located at the position represented by reference numeral 23, the position of the blue filter B and the position of the red filter R are reverse to those when the pixel block Br is located at the position represented by reference numeral 22. When the pixel block Br (referred to as an image portion 24) is located at the position represented by reference numeral 24, the position of the blue filter B and the position of the red filter R are reverse to those when the pixel block Br is located at the position represented by reference numeral 21.

Figure 2:
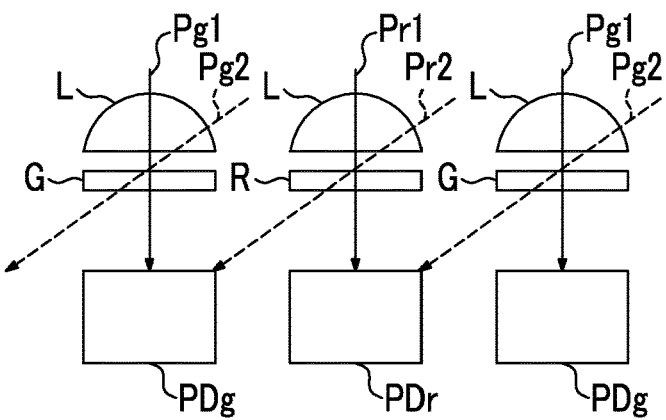
FIG. 2 illustrates an aspect in which light is obliquely incident.
Figure 3:
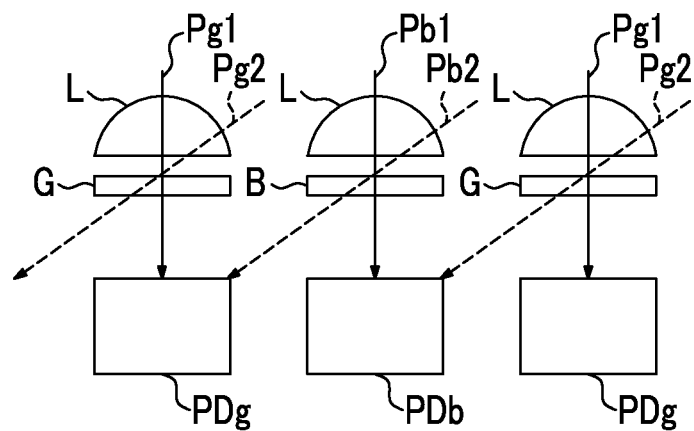
FIG. 3 illustrates an aspect in which light is obliquely incident.

FIGS. 2 and 3 illustrate the relationship among the photoelectric conversion element 11, the color filter, and a microlens, as viewed from the side.

Referring to FIG. 2, the photoelectric conversion element 11 having the light receiving surface on which the green filter G is formed is represented by PDg and the photoelectric conversion element 11 having the light receiving surface on which the red filter R is formed is represented by PDr. A microlens L is provided above the color filter G or R.

A light component that passes through the color filter G or R is green or red. Therefore, when light Pg1 or Pr1 which is vertically incident on the plane of the color filter G or R as represented by a solid line Pg1 or Pr1 passes through the color filter G or R, a green or red light component is incident on a photoelectric conversion element PDg or PDr having a light receiving surface on which the color filter G or R is formed. A signal charge corresponding to the level of the green or red light component is stored in the photoelectric conversion element PDg or PDr. When light Pg2 or Pr2 which is obliquely incident on the plane of the color filter G or R as represented by a dashed line Pr2 or Pg2 passes through the color filter G or R, a green or red light component is incident on a photoelectric conversion element PDr or PDg adjacent to the photoelectric conversion element PDg or PDr having the light receiving surface on which the color filter G or R is formed. Not only a signal charge corresponding to the level of the red light component but also a signal charge corresponding to the level of the mixed green light component is stored in the photoelectric conversion element PDr. Similarly, not only a signal charge corresponding to the level of the green light component but also a signal charge corresponding to the level of the mixed red light component is stored in the photoelectric conversion element PDg.

Referring to FIG. 3, the photoelectric conversion element 11 having the light receiving surface on which the green filter G is formed is represented by PDg and the photoelectric conversion element 11 having the light receiving surface on which the blue filter B is formed is represented by PDb. A microlens is provided above the color filter G or B.

Similar to FIG. 2, light Pg1 which is vertically incident on the plane of the color filter G is incident on the photoelectric conversion element PDg. Light Pg2 which is obliquely incident on the color filter G as represented by a dashed line is incident on the photoelectric conversion element PDb adjacent to the photoelectric conversion element PDg. In addition, light Pb1 which is vertically incident on the plane of the color filter B is incident on the photoelectric conversion element PDb. Light Pb2 which is obliquely incident on the color filter B as represented by a dashed line is incident on the photoelectric conversion element PDg adjacent to the photoelectric conversion element PDb.

FIGS. 4 to 7 are diagrams illustrating the mixture of color light with the pixel of green color component and mixture correction.

Figure 4:
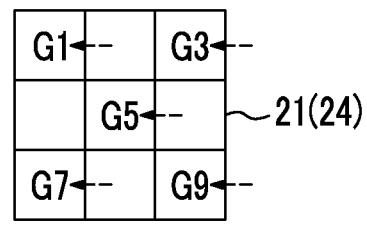
FIG. 4 illustrates an image portion of an object image.

FIG. 4 illustrates an aspect of the above-mentioned mixture. Specifically, FIG. 4 illustrates an aspect in which, when an image portion 21 or 24 corresponding to the pixel block Br represented by reference numeral 21 or reference numeral 24 illustrated in FIG. 1 is considered, light components from the right side are mixed with the photoelectric conversion elements 11 having the light receiving surfaces on which the green filters G1, G3, G5, G7, and G9 are formed, as represented by dashed arrows.

When the image portion 21 corresponding to the pixel block Br represented by reference numeral 21 is considered, in some cases, a light component that passes through the red filter R arranged on the right side of the photoelectric conversion element 11 having the light receiving surface on which the green filter G1 is formed is mixed with the photoelectric conversion element 11 having the green filter G1. Similarly, light components that pass through the red filter R, the blue filter B, the red filter R, and the red filter R arranged on the right side of the photoelectric conversion elements 11 having the light receiving surfaces on which the green filters G3, G5, G7, and G9 are formed are mixed with the photoelectric conversion elements 11 having the green filters G3, G5, G7, and G9, respectively.

Figure 5:
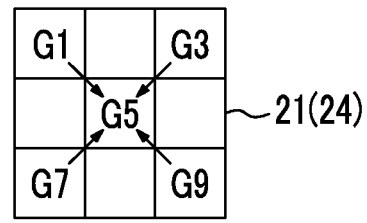
FIG. 5 illustrates an image portion of the object image.

FIG. 5 illustrates an aspect in which, when an image portion 21 (or 24) corresponding to the pixel block Br represented by reference numeral 21 (or reference numeral 24) is considered, a signal charge (original pixel) indicating green is mixed (pixel mixture), as represented by a solid arrow. Image reduction and image interpolation are simultaneously performed by the pixel mixture.

The pixels G1 to G5 which are arranged at the center and four corners and indicate green components are mixed into one pixel. Then, the image portion 21A is reduced to ⅕.

When pixel mixture is performed as illustrated in FIG. 5, light components indicating pixels adjacent to the pixels G1 to G5 (original pixels) of the green color components are mixed with the pixels G1 to G5 of the green color components before pixel mixture, as illustrated in FIG. 4. In this embodiment, mixed data is reduced from the mixed pixel to perform mixture correction. When the image portion 21 is located at the position of the pixel block Br represented by reference numeral 21 as illustrated in FIG. 1, it is assumed that the amount of data of a light component which passes through the red filter R and is mixed with the photoelectric conversion element 11 having the filter G1 formed therein is Mr. Similarly, when the amounts of data of light components that pass through the red filter R, the blue filter B, the red filter R, and the red filter R and are mixed with the photoelectric conversion elements 11 having the light receiving surfaces on which the filters G3, G5, G7, and G9 are formed are Mr, Mb, Mr, and Mr, respectively, the amount of data of the light components mixed with the pixels of the green color components after pixel mixture is (4Mr+Mb). The pixels of the green color components after pixel mixture are averaged (the average five pixels G1 to G5) and the average (4Mr+Mb)/5 of the amounts of data (4Mr+Mb) is subtracted from data indicating the pixel of the green color components after pixel mixture to perform mixture correction.

In an image portion 24A corresponding to the case in which the pixel block Br is located at the position represented by reference numeral 24, it can be understood that (4Mb+Mr)/5 is subtracted from the amount of data of the green component after pixel mixture to perform mixture correction.

Figure 6:
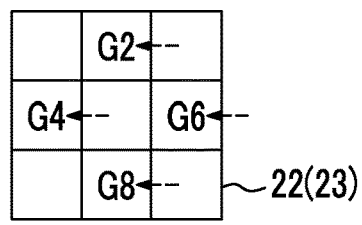
FIG. 6 illustrates an image portion of the object image.

FIG. 6 illustrates pixels G2, G4, G6, and G8 of the green color components in the image portions 22 and 24 at the positions represented by reference numeral 22 and reference numeral 23 in FIG. 1.

Pixels R (or B), B (or R), B (or R), and R (or B) are arranged on the right side of the pixels G2, G4, G6, and G8, respectively.

Figure 7:
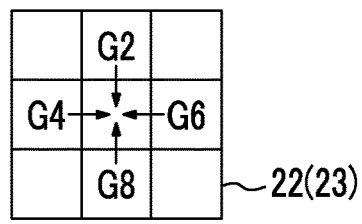
FIG. 7 illustrates an image portion of the object image.

FIG. 7 illustrates an aspect of pixel mixture in the image portions 22 and 24.

Since the pixels G2, G4, G6, and G8 are located on the upper, left, right, and lower sides of the position of the central pixel, respectively, the pixels G2, G4, G6, and G8 are mixed and averaged to perform pixel mixture. For the mixed pixel (reduced pixel), (2Mb+2Mr)/4 is subtracted from data indicating the mixed pixel, regardless of the image portion 22 or 24, to perform mixture correction, similarly to the above.

FIGS. 8 to 14 are diagrams illustrating the mixture of a light component with the pixel of red color component and mixture correction.

Figure 8:
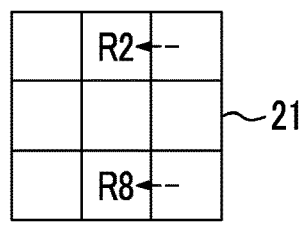
FIG. 8 illustrates an image portion of the object image.

FIG. 8 is a diagram illustrating mixture, as described above, and FIG. 9 is a diagram illustrating pixel mixture.

Figure 9:
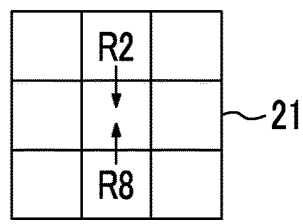
FIG. 9 illustrates an image portion of the object image.

Referring to FIG. 8, light components from the pixels of the green color components which are arranged on the right side of the pixels R2 and R8 of the red color components in the image portion 21 are mixed with the pixels R2 and R8 of the red color components. Referring to FIG. 9, since the pixels R2 and R4 of the red color components are arranged on the upper and lower sides of the position of the central pixel, the mixed pixel of the red color component after pixel mixture is (R2+R8)/2. Since the amount of mixture correction data is Mg (the amount of mixed data from the pixel of the green color component), the amount of mixture correction data Mg is subtracted from the amount of data (R2+R8)/2 of the red component after pixel mixture.

Figure 10:
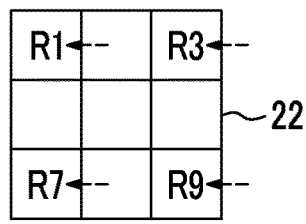
FIG. 10 illustrates an image portion of the object image.

FIG. 10 is a diagram illustrating mixture, as described above, and FIG. 11 is a diagram illustrating pixel mixture.

Figure 11:
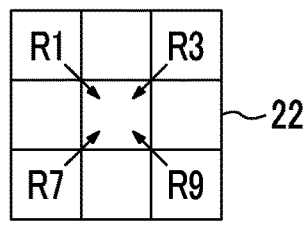
FIG. 11 illustrates an image portion of the object image.

Referring to FIG. 10, light components from the pixels of the green color components which are arranged on the right side of the red pixels R1, R3, R7, and R9 of the red color components in the image portion 22 are mixed with the pixels R1, R3, R7, and R9 of the red color components. Referring to FIG. 11, since the pixels R1, R3, R7, and R9 of the red color components are arranged at four corners, the mixed pixel of the red color components after pixel mixture is (R1+R3+R7+R9)/4. Since the amount of mixture correction data is Mg, the amount of mixture correction data Mg is subtracted from the amount of data (R1+R3+R7+R9)/4 of the mixed pixel to perform mixture correction.

Figure 12:
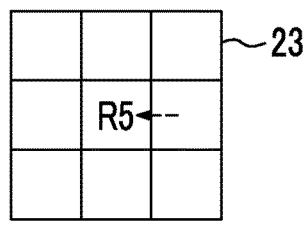
FIG. 12 illustrates an image portion of the object image.

FIG. 12 illustrates the image portion 23 at the position 23 illustrated in FIG. 1 and is a diagram illustrating mixture.

In the image portion 23, the pixel R5 of the red color component is arranged at the center of the image portion 23 and a light component from the pixel of the green color component which is arranged on the right side of the pixel R5 of the red color component is mixed with the pixel R5 of the red color component. Therefore, the amount of mixture correction data Mg is subtracted from the amount of data of the pixel R5 to perform mixture correction.

Figure 13:
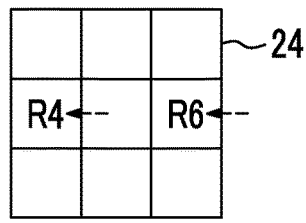
FIG. 13 illustrates an image portion of the object image.
Figure 14:
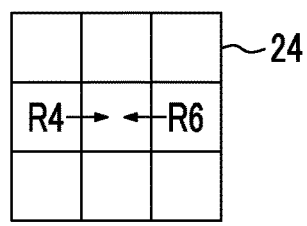
FIG. 14 illustrates an image portion of the object image.

FIG. 13 is a diagram illustrating the above-mentioned mixture and FIG. 14 is a diagram illustrating pixel mixture.

Referring to FIG. 13, it is assumed that light components from the pixels of the green color components which are arranged on the right side of the pixels R4 and R6 of the red color components are mixed with the pixels R4 and R6 of the red color components in the image portion 24. Referring to FIG. 14, since the pixels R4 and R6 are arranged on the left and right sides of the position of the central pixel, the mixed pixel of the red color component after pixel mixture is (R4+R6)/2. Since the amount of mixture correction data is Mg, the amount of mixture correction data Mg is subtracted from the amount of data (R4+R6)/2 of the mixed pixel to perform mixture correction.

FIGS. 15 to 21 are diagrams illustrating the mixture of a light component with the pixel of blue color component and mixture correction.

Figure 15:
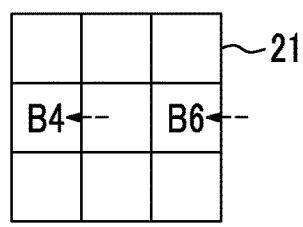
FIG. 15 illustrates an image portion of the object image.

FIG. 15 is a diagram illustrating the mixture, as described above, and FIG. 16 is a diagram illustrating pixel mixture.

Figure 16:
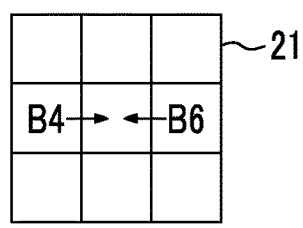
FIG. 16 illustrates an image portion of the object image.

Referring to FIG. 15, it is assumed that light components from the pixels of the green color components which are arranged on the right side of pixels B4 and B6 of the blue color components in the image portion 21 are mixed with the pixels B4 and B6 of the blue color components. Referring to FIG. 16, since the pixels B4 and B6 of the blue color components are arranged on the left and right sides of the position of the central pixel, the amount of data of the mixed pixel after pixel mixture is (B4+B6)/2. Since the amount of mixture correction data is Mg, the amount of mixture correction data Mg is subtracted from the amount of data (B4+B6)/2 of the blue component after pixel mixture to perform mixture correction.

Figure 17:
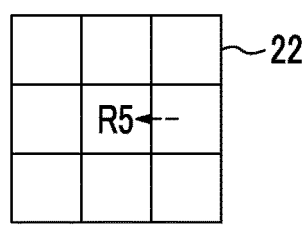
FIG. 17 illustrates an image portion of the object image.

FIG. 17 illustrates a blue component in the image portion 22.

A pixel B5 arranged at the center is a blue component of the image portion 22. The amount of mixture correction data Mg is subtracted from the amount of data of the pixel B5 to perform mixture correction.

Figure 18:
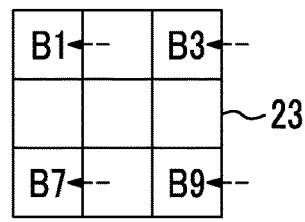
FIG. 18 illustrates an image portion of the object image.

FIG. 18 is a diagram illustrating mixture, as described above, and FIG. 19 is a diagram illustrating pixel mixture.

Light components from the pixels of the green color components which are arranged on the right side of pixels B1, B3, B7, and B9 of the blue color components in the image portion 23 are mixed with the pixels B1, B3, B7, and B9 of the blue color components.

Figure 19:
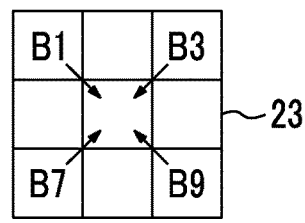
FIG. 19 illustrates an image portion of the object image.

Referring to FIG. 19, since the pixels B1, B3, B7, and B9 of the blue color components are arranged at four corners, the mixed pixel of the blue color component after pixel mixture is (B1+B3+B7+B9)/4. Since the amount of mixture correction data is Mg, the amount of mixture correction data Mg is subtracted from the amount of data (B1+B3+B7+B9)/4 of the mixed pixel to perform mixture correction.

Figure 20:
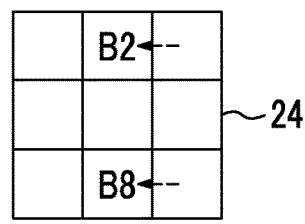
FIG. 20 illustrates an image portion of the object image.
Figure 21:
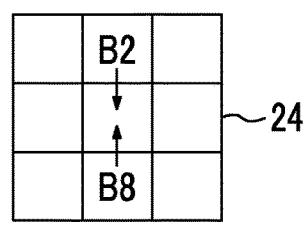
FIG. 21 illustrates an image portion of the object image.

FIG. 20 is a diagram illustrating the above-mentioned mixture and FIG. 21 is a diagram illustrating pixel mixture.

Referring to FIG. 20, it is assumed that light components from the pixels of the green color components which are arranged on the right side of pixels B2 and B8 of the blue color components in the image portion 24 are mixed with the pixels B2 and B8 of the blue color components. Referring to FIG. 21, since the pixels B2 and B8 are arranged on the upper and lower sides of the position of the central pixel, the mixed pixel of the blue color component after pixel mixture is (B2+B8)/2. Since the amount of mixture correction data is Mg, the amount of mixture correction data Mg is subtracted from the amount of data (B2+B8)/2 of the mixed pixel to perform mixture correction. As described above, the amount of mixture correction data to be subtracted varies depending on the color pattern of the original pixels.

In the above description, it is assumed that light components from the pixels which are arranged on the right side of the original pixels for generating the mixed pixel are mixed with the original pixels. However, the pixel with which the light component is mixed varies depending on the position of the photoelectric conversion element which stores a signal charge indicating the original pixel. For example, when the original pixels forming the mixed pixel are arranged in an upper part of the color image, light components from the pixels below the mixed pixel are mixed with the original pixels. Similarly, when the original pixels forming the mixed pixel are arranged in a lower part of the color image, light components from the pixels above the mixed pixel are mixed with the original pixels. When the original pixels forming the mixed pixel are arranged in a right part of the color image, light components from the pixels which are arranged on the left side of the mixed pixel are mixed with the original pixels. When the original pixels forming the mixed pixel are arranged in a left part of the color image, light components from the pixels which are arranged on the right side of the mixed pixel are mixed with the original pixels.

In this embodiment, the amount of mixture correction data is determined according to the position of the mixed pixel in the color image.

Figures 22, 23:
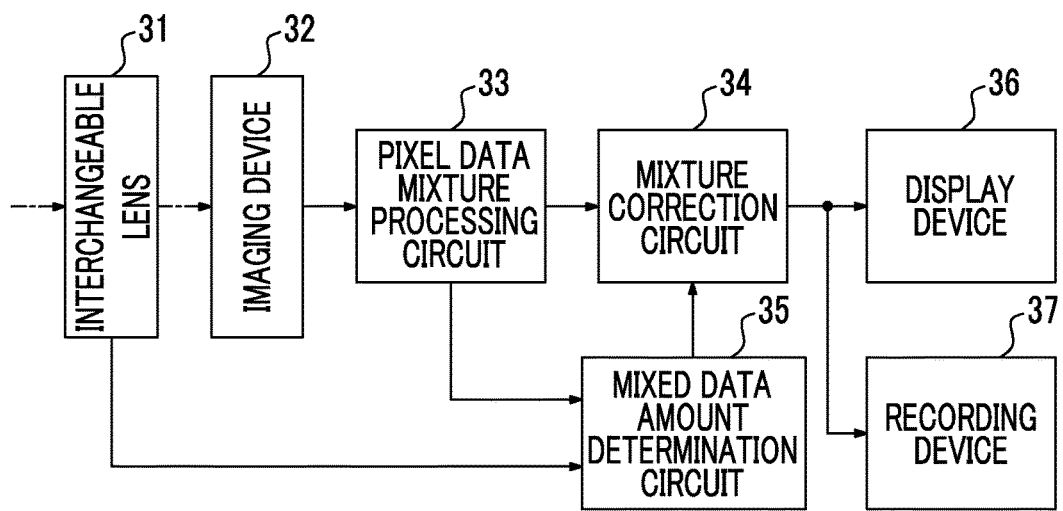
FIG. 22 illustrates an object image.
FIG. 23 is a block diagram illustrating the electrical structure of a digital camera.

FIG. 22 illustrates an example of an object image 30 captured by the solid-state electronic imaging device 10.

The object image 30 is divided into eight parts in each of the horizontal direction and the vertical direction, that is, a total of 64 regions a1 to a64. As described above, the amount of mixture correction data is determined according to which of the divided regions a1 to a64 an image portion (mixed pixel) defined by the pixel block Br is included in. The image of a reference object is captured and the amount of mixture correction data is actually measured in advance. In addition, the amount of mixture correction data may be determined as follows.

For example, when the above-mentioned pixel mixture and mixture correction are performed for an image portion which is included in the regions a3 to a6 and a11 to a14 in the upper part of the object image 30, light components from pixels which are adjacent to the original pixels used for pixel mixture in the lower direction are generally mixed with the original pixels. Therefore, mixture correction is performed such that the mixture of the light components is reduced. Conversely, for an image portion included in the regions a51 to a54 and a59 to a62 in the lower part of the object image 30, light components from pixels which are adjacent to the original pixels used for pixel mixture in the upper direction are generally mixed with the original pixels. Therefore, mixture correction is performed such that the mixture of the light components is reduced.

In an image portion which is included in the region a23, a24, a31, a32, a39, a40, a47, or a48 in the right part of the object image 30, light components from pixels which are adjacent to the original pixels used for pixel mixture in the left direction are generally mixed with the original pixels. Therefore, mixture correction is performed such that the mixture of the light components is reduced. In an image portion which is included in the region a17, a18, a25, a26, a33, a34, a41, or a42 in the left part of the object image 30, light components from pixels which are adjacent to the original pixels used for pixel mixture in the right direction are generally mixed with the original pixels. Therefore, mixture correction is performed such that the mixture of the light components is reduced.

In addition, in an image portion which is included in the regions a1, a2, a9, and a10 in the upper left portion of the object image 30, an image portion which is included in the regions a7, a8, a15, and a16 in the upper right portion of the object image 30, an image portion which is included in the regions a49, a50, a57, and a58 in the lower left portion of the object image 30, and an image portion which is included in the regions a55, a59, a63, and a64 in the lower right portion of the object image 30, light components from pixels which are adjacent to the original pixels used for pixel mixture in the lower right direction, the lower left direction, the upper right direction, and the upper left direction are generally mixed with the original pixels. Therefore, mixture correction is performed such that the mixture of the light components is reduced. In the other regions, mixture correction may not be performed since it is considered that the degree of mixture is small. In addition, the minute amount of correction may be determined for each region and mixture correction may be performed.

FIG. 23 is a block diagram illustrating the electrical structure of a digital camera (including an imaging apparatus, a digital movie camera, and a digital still camera).

An interchangeable lens 31 is detachably mounted on the digital camera.

When the digital camera is turned on and an imaging mode is set, an object image is formed on an imaging surface of the imaging device 10 by the interchangeable lens 31. Color image data indicating the object image is output from the imaging device 10 and is then input to a pixel data mixture processing circuit 33.

As described above, the pixel data mixture processing circuit 33 performs pixel mixture for each pixel block Br. Reduced color image data indicating a reduced color object image is generated from the color image data indicating the color object image by the pixel mixture process of the pixel data mixture processing circuit 33. In addition, the color image data before pixel mixture which is input to the pixel data mixture processing circuit 33 passes through the pixel data mixture processing circuit 33 and is input to a mixture correction data amount determination circuit 35.

Lens information indicating the characteristics of the interchangeable lens 31 is stored in the interchangeable lens 31. The incident angle of light on each photoelectric conversion element 11 varies depending on lens characteristics. Therefore, the amount of mixture varies depending on lens characteristics. The amount of mixture correction data for each type of lens is stored in the mixture correction data amount determination circuit 35 and mixture correction is performed using the amount of mixture correction data, according to the type of lens which is determined on the basis of lens information.

As described above, the mixture correction data amount determination circuit 35 determines the amount of mixture correction data, on the basis of the position of the original pixels used for pixel mixture in the color object image 30. Data indicating the determined amount of mixture correction data is input from the mixture correction data amount determination circuit 35 to a mixture correction circuit 34. The mixture correction circuit 34 performs a mixture correction process on the basis of the position of the mixed pixel such that mixed data is reduced, as described above.

The mixture-corrected reduced color image data is transmitted to a display device 36. Then, a mixture-corrected reduced color image is displayed on a display screen of the display device 36.

When a shutter release button (not illustrated) is pressed, recording device 37 records the mixture-corrected reduced color image data on a recording medium such as a memory card. In addition, when the shutter release button is pressed, the imaging device 10 may capture a new image and not reduced color image data but color image data which is not subjected to pixel mixture may be recorded on a recording medium such as a memory card.

In the above-described embodiment, the interchangeable lens 31 is detachably mounted on the digital camera. However, the above-mentioned mixture correction may be performed for a digital camera on which a non-interchangeable lens is fixedly mounted.

Figure 24:
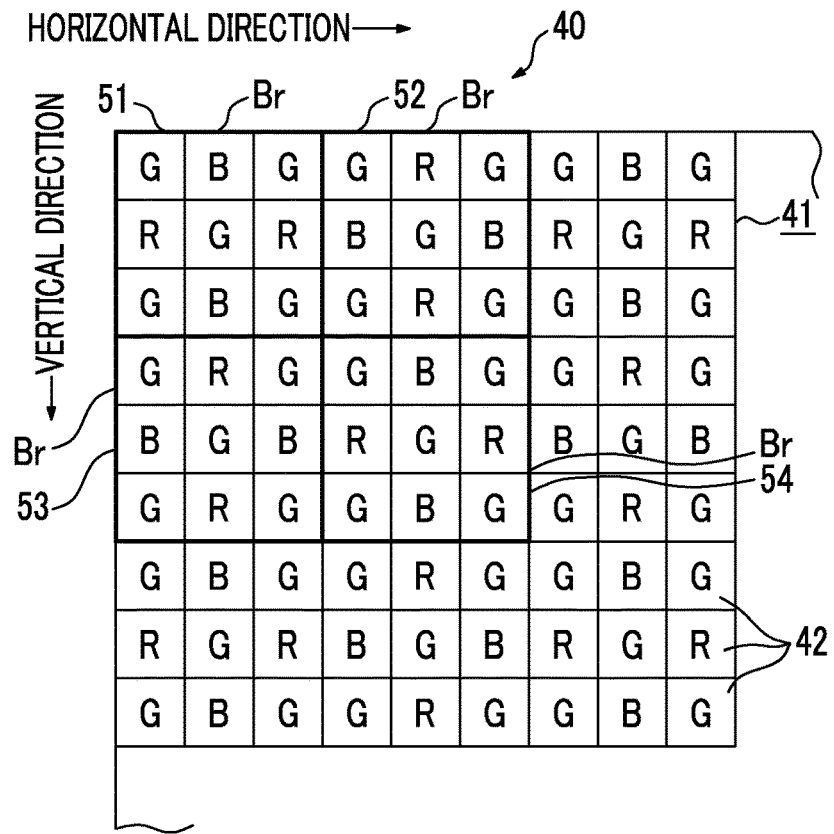
FIG. 24 illustrates a portion of an imaging device.

FIG. 24 illustrates a portion of a light receiving surface of a solid-state electronic imaging device 40.

The solid-state electronic imaging device 40 includes a plurality of photoelectric conversion elements 42 which are arranged in the horizontal direction and the vertical direction. A red filter R, a green filter G, or a blue filter B is formed on the light receiving surface of the photoelectric conversion element 42, similarly to the above-mentioned structure.

In FIG. 24, nine photoelectric conversion elements 42 are extracted in each of the horizontal direction and the vertical direction. As such, a block in which nine photoelectric conversion elements 42 are arranged in each of the horizontal direction and the vertical direction is referred to as a large block 41. The large block 41 includes nine pixel blocks which are three pixel blocks Br in the horizontal direction by three pixel blocks Br in the vertical direction.

Similarly to the structure illustrated in FIG. 1, a set of a total of nine photoelectric conversion element 42 which are three photoelectric conversion elements 42 in the horizontal direction by three photoelectric conversion elements 42 in the vertical direction corresponds to the pixel block Br. In FIG. 24, the pixel blocks Br are illustrated at positions represented by reference numerals 51, 52, 53, and 54. Pixel mixture is performed for each pixel block Br by the same method as described above.

Figure 25:
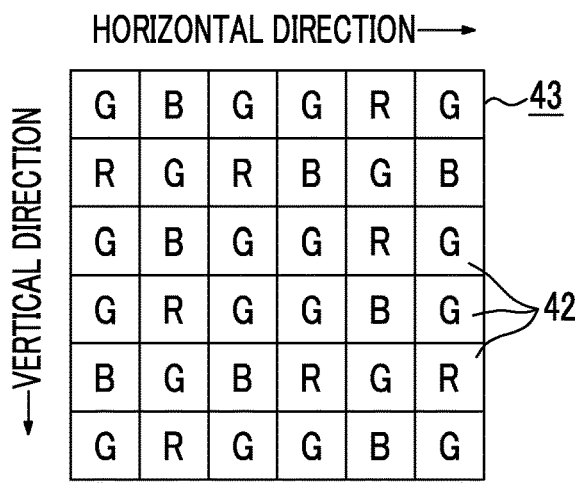
FIG. 25 illustrates a portion of the imaging device.

FIG. 25 illustrates six photoelectric conversion elements 42 in the horizontal direction by six photoelectric conversion elements 42 in the vertical direction which are extracted from the light receiving surface of the solid-state electronic imaging device 40 illustrated in FIG. 24.

A set of six photoelectric conversion elements 42 in the horizontal direction by six photoelectric conversion elements 42 in the vertical direction is referred to as a medium block 43. The medium block 43 includes four pixel blocks Br which are two pixel blocks Br in the horizontal direction by two pixel blocks Br in the vertical direction.

In the medium block 43, at least one green filter G, at least one red filter R, and at least one blue filter B are arranged in the horizontal direction and the vertical direction. When the medium block 43 is repeatedly arranged, at least one green filter G is arranged in the horizontal direction, the vertical direction, and the oblique direction. The medium block 43 includes at least one portion having two consecutive green filters G in the horizontal direction, the vertical direction, and the oblique direction. In addition, the medium block 43 includes at least one portion having two consecutive green filters G in the horizontal direction and the vertical direction. The arrangement of the color filters in the medium block 43 is repeated in the horizontal direction and the vertical direction to obtain the arrangement of the color filters of the solid-state electronic imaging device 40.

For example, in the medium block 43, the green filters G are formed in a (6m (m is a positive integer)+1)-th column, a (6m+3)-th column, a (6m+4)-th column, and a (6m+6)-th column in a (6n (n is a positive integer)+1)-th row, a (6n+3)-th row, a (6n+4)-th row, and a (6n+6)-th row. In addition, the green filters G are formed in a (6m+2)-th column and a (6m+5)-th column in a (6n+2)-th row and a (6n+5)-th row. Similarly, the blue filters B are formed in the (6m+2)-th column in the (6n+1)-th row and the (6n+3)-th row, are formed in the (6m 4)-th column and the (6m+6)-th column in the (6n+2)-th row, are formed in the (6m+5)-th column in the (6n+4)-th row and the (6n+6)-th row, and are formed in the (6m+1)-th column and the (6m+3)-th column in the (6n+5)-th row. The red filters R are formed in the (6m+5)-th column in the (6n+1)-th row, are formed in the (6m+1)-th column and the (6m+3)-th column in the (6n+2)-th row, are formed in the (6m+2)-th column in the (6n+4)-th row and the (6n+6)-th row, and are formed in the (6m+4)-th column and the (6m+6)-th column in the (6n+5)-th row.

In the pixel block Br represented by reference numeral 51 in FIG. 24, the green filters G are formed at the center and on the upper left side, the lower left side, the upper right side, and the lower right side of the center. The blue filters B are formed on the upper and lower sides of the green filter G formed at the center and the red filters R are formed on the left and right sides of the green filter G formed at the center.

A pixel block Br which is located at the position represented by reference numeral 51 or 54 and in which the blue filters B are formed on the upper and lower sides of the green filter G formed at the center and the red filters R are formed on the left and right sides of the green filter G and a pixel block Br which is located at the position represented by reference numeral 52 or 53 and in which the positions of the blue filters B and the red filters R are reverse to those in the pixel block Br are alternately repeated in the horizontal direction and the vertical direction to obtain the arrangement of the color filters of the solid-state electronic imaging device 40 (the large block 41 and the medium block 43).

In the pixel block Br, all of the red filter R, the green filter G, and the blue filter B are included in the photoelectric conversion elements 42 in the pixel block Br and the color filters are formed so as to be symmetric with respect to a photoelectric conversion element 42 formed at the center.

In the above-mentioned example, the red filter R, the green filter G, or the blue filter B is formed on the light receiving surface of the photoelectric conversion element 11. However, a cyan filter having filter characteristics that transmit a light component of cyan C, a magenta filter having filter characteristics that transmit a light component of magenta M, and a yellow filter having filter characteristics that transmit a light component of yellow Y may be formed in the above-mentioned array. Here, the cyan C, the magenta M, and the yellow Y are complementary colors of the three primary colors.

In the arrangement of the color filters illustrated in FIG. 24 and FIG. 25, the mixture of light components illustrated in FIG. 2 to FIG. 21 occurs and mixture correction is performed.

The arrangement of the pixels G included in the pixel block Br represented by reference numerals 51 and 54 is the same as that illustrated in FIG. 4. When light components from pixels which are adjacent to the right side of the pixels G are mixed with the pixels G, the amount of mixture correction data is (2Mb+2Mg+Mr). As described above, the average amount of mixture correction data (2Mb+2Mg+Mr)/5 is reduced from the average amount of data of the mixed pixel G to perform mixture correction.

The arrangement of the pixels G included in the pixel block Br represented by reference numerals 52 and 53 is the same as that illustrated in FIG. 4. When light components from pixels which are adjacent to the right side of the pixels G are mixed with the pixels G, the amount of mixture correction data is (2Mr+2Mg+Mb). Therefore, the average amount of mixture correction data (2Mr+2Mg+Mb)/5 is reduced from the average amount of data of the mixed pixel G to perform mixture correction.

The arrangement of the pixels R included in the pixel block Br represented by reference numerals 52 and 53 is the same as that illustrated in FIG. 8. When light components from the pixels G which are adjacent to the right side of the pixels R are mixed with the pixels R, the amount of mixture correction data is 2Mg. Therefore, the average amount of mixture correction data Mg is reduced from the average amount of data of the mixed pixel R to perform mixture correction. Similarly, the arrangement of the pixels B included in the pixel block Br represented by reference numerals 51 and 54 is the same as that illustrated in FIG. 20. When light components from the pixels G which are adjacent to the right side of the pixels B are mixed with the pixels B, the amount of mixture correction data is 2Mg. Therefore, the average amount of mixture correction data Mg is reduced from the average amount of data of the mixed pixel B to perform mixture correction.

The arrangement of the pixels R included in the pixel block Br represented by reference numerals 51 and 54 is the same as that illustrated in FIG. 13. When light components from the pixels G or the pixels B which are adjacent to the right side of the pixels R are mixed with the pixels R, the amount of mixture correction data is Mg+Mr. Therefore, the average amount of mixture correction data (Mg+Mr)/2 is reduced from the average amount of data of the mixed pixel R to perform mixture correction. Similarly, the arrangement of the pixels B included in the pixel block Br represented by reference numerals 52 and 53 is the same as that illustrated in FIG. 15. When light components from the pixels G or the pixels B which are adjacent to the right side of the pixels B are mixed with the pixels B, the average amount of mixture correction data (Mg+Mr)/2 is reduced from the average amount of data of the mixed pixel B to perform mixture correction.

The amount of mixture correction data for color image data indicating an object image which is captured by the imaging device 40 having the color filter array illustrated in FIG. 24 and FIG. 25 is determined according to the position of the pixels, as illustrated in FIG. 22.

FIGS. 26 to 28 illustrate image portions of the object image captured by the imaging device 10 having the Bayer array illustrated in FIG. 1.

In the above-described embodiment, weighting is not performed when mixture correction is performed for the mixed pixel. However, here, the original pixels used for the mixed pixel are weighted to make the value of the average amount of mixture data constant.

FIG. 26 illustrates an image portion 22. In the image portion 22, the average amount of mixture data (Mr+Mb)/2 is reduced from the averaged mixed pixel G to perform mixture correction, as illustrated in FIG. 6 and FIG. 7. Weight coefficients for the pixels G generating the mixed pixel are all 1, as illustrated in the parentheses. The weighting in the image portion 22 is the same as that in an image portion 23.

FIG. 27 illustrates an image portion 21. In the image portion 21, as illustrated in FIGS. 4 and 5, when weighting is not performed, the average amount of mixture data (4Mr+Mb)/5 is reduced from the averaged mixed pixel G. However, in this embodiment, the weight coefficient of the central pixel G among the pixels G generating the mixed pixel is four times greater than the weight coefficient of the pixels G at four corners. Therefore, the average amount of mixture data (4Mr+4Mb)/8=(Mr+Mb)/2 is reduced from the averaged mixed pixel G to perform mixture correction.

FIG. 28 illustrates an image portion 24. In the image portion 24, as illustrated in FIGS. 4 and 5, when weighting is not performed, the average amount of mixture data (Mr+4Mb)/5 is reduced from the averaged mixed pixel G. However, in this embodiment, similarly to FIG. 27, the weight coefficient of the central pixel G among the pixels G generating the mixed pixel is four times greater than the weight coefficient of the pixels G at four corners. Therefore, the average amount of mixture data (4Mr+4Mb)/8=(Mr+Mb)/2 is reduced from the averaged mixed pixel G to perform mixture correction.

Figure 30:
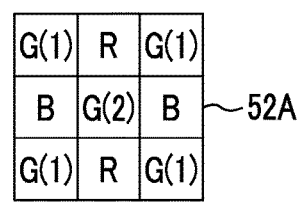
FIG. 30 illustrates an image portion of the object image.

FIGS. 29 and 30 illustrate image portions of an object image captured by the imaging device 40 having the array illustrated in FIG. 24.

In FIGS. 29 and 30, similarly to FIGS. 26 to 28, the original pixels used for the mixed pixel are weighted to make the value of the average amount of mixture data constant.

FIG. 29 illustrates an image portion 51A corresponding to the pixel block Br which is located at the position represented by reference numerals 51 and 54 in FIG. 24. When weighting is not performed, the average amount of mixture data (2Mg+2Mb+Mr)/5 is reduced from the averaged mixed pixel G. However, in this embodiment, the weight coefficient of the central pixel G among the pixels G generating the mixed pixel is two times greater than the weight coefficient of the pixels G at four corners. Therefore, the average amount of mixture data (2Mg+2Mb+2Mr)/6 is reduced from the averaged mixed pixel G to perform mixture correction.

FIG. 30 illustrates an image portion 52A corresponding to the pixel block Br which is located at the position represented by reference numerals 52 and 53 in FIG. 24. When weighting is not performed, the average amount of mixture data (2Mg+Mb+2Mr)/5 is reduced from the averaged mixed pixel G similarly to the above. However, in this embodiment, the weight coefficient of the central pixel G among the pixels G generating the mixed pixel is two times greater than the weight coefficient of the pixels G at four corners. Therefore, the average amount of mixture data (2Mg+2Mb+2Mr)/6 is reduced from the averaged mixed pixel G to perform mixture correction.

In the above-described embodiment, mixture correction is performed for the pixel G. However, mixture correction for the pixel R or the pixel B is the same as that for the pixel G.

In the imaging device 10 illustrated in FIG. 1, the pixel block Br has a size of three pixels×three pixels and the repetitive pattern of the color filters has a size of two pixels×two pixels. That is, the pixel block Br and the repetitive pattern have different sizes. In addition, in the imaging device 40 illustrated in FIG. 24, the pixel block Br has a size of three pixels×three pixels and the repetitive pattern of the color filters has a size of six pixels×six pixels. That is, the pixel block Br and the repetitive pattern have different sizes.

In the imaging device, the size of the repetitive pattern of the color filters is not limited to two pixels×two pixels or six pixels×six pixels. The invention can be applied to an imaging device with a repetitive pattern size of S pixels×T pixels (S and T are natural numbers that are equal to or greater than 2 and equal to or less than 10).

The size of the pixel block Br is not limited to three pixels×three pixels. The size of the pixel block Br may vary depending on the resolution of the set reduced color image data. For example, the pixel block Br can have a size of M pixels×N pixels (M and N are natural numbers that are equal to or greater than 3 and are equal to or less than three times the values of S and T), such as a size of four pixels×four pixels, a size of five pixels×five pixels, or a size of six pixels×six pixels. Here, when the pixel block Br has a size of M pixels×N pixels (M is an odd number that is equal to or greater than 3 and is equal to or less than three times the value of S), it is possible to perform pixel mixture such that the center of gravity of the mixed pixel of each color after pixel mixture is located at the same pixel position. In this case, the invention can also be applied to the structure in which the size of the repetitive pattern of the color filters, which is S pixels×T pixels, and the size of the pixel block Br, which is M pixels×N pixels, are not equal to each other, but are different from each other.

When the pixel block Br is a pixel block with a size of M pixels×N pixels (M and N are natural numbers equal to or greater than 3) including a plurality of adjacent original pixels, it is possible to improve the accuracy of data for the mixed pixel after pixel mixture.

As illustrated in FIG. 24, in 2×2 (four) pixel blocks Br (enlarged pixel blocks) represented by reference numerals 51 to 54, the pixel block Br represented by reference numeral 51 or reference numeral 52 and the pixel block Br represented by reference numeral 54 or reference numeral 53 have the same pixel array. As such, the enlarged pixel blocks include at least two pixel blocks Br having the same color filter array. According to this structure, it is possible to simplify the mixture correction process.

In the above-described embodiment, the amount of mixture correction data is subtracted from the amount of data of the mixed pixel to perform mixture correction such that the amount of data mixed with pixel data is reduced. However, mixed pixel data may be multiplied by a rate corresponding to a mixture rate to perform correction.

In the above-described embodiment, pixel mixture makes it possible to perform image reduction and pixel interpolation at the same time. This is because pixel mixture is performed such that the center of gravity of the mixed pixel of each color after the pixels of the green color components, the pixels of the blue color components, and the pixels of the red color components, which are the original pixels of each color, are mixed is located at the same pixel position. Since image reduction and pixel interpolation are simultaneously performed by the pixel mixture, it is possible to omit an interpolation process (also referred to as demosaic processing) which is generally performed as a separate process, to simplify the structure of a processing circuit, and to increase a processing speed.

Figure 31:
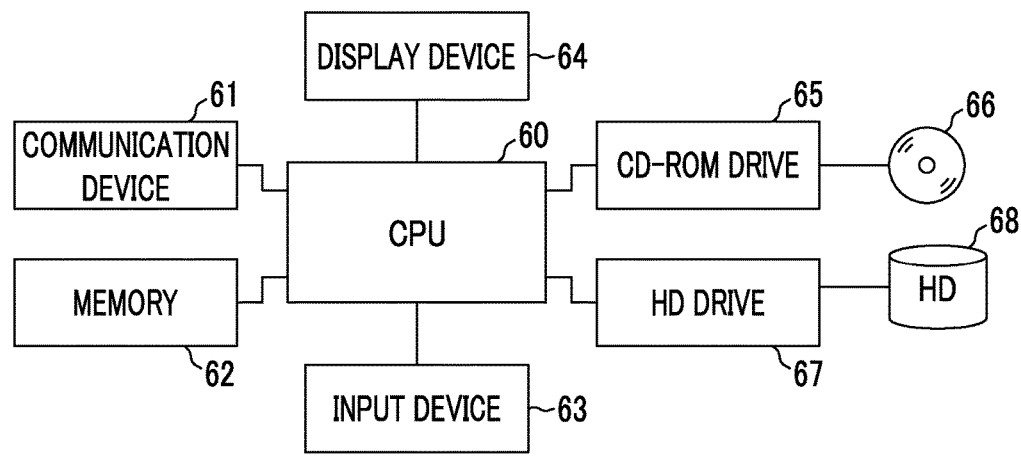
FIG. 31 is a block diagram illustrating the electrical structure of a personal computer.
Figure 32:
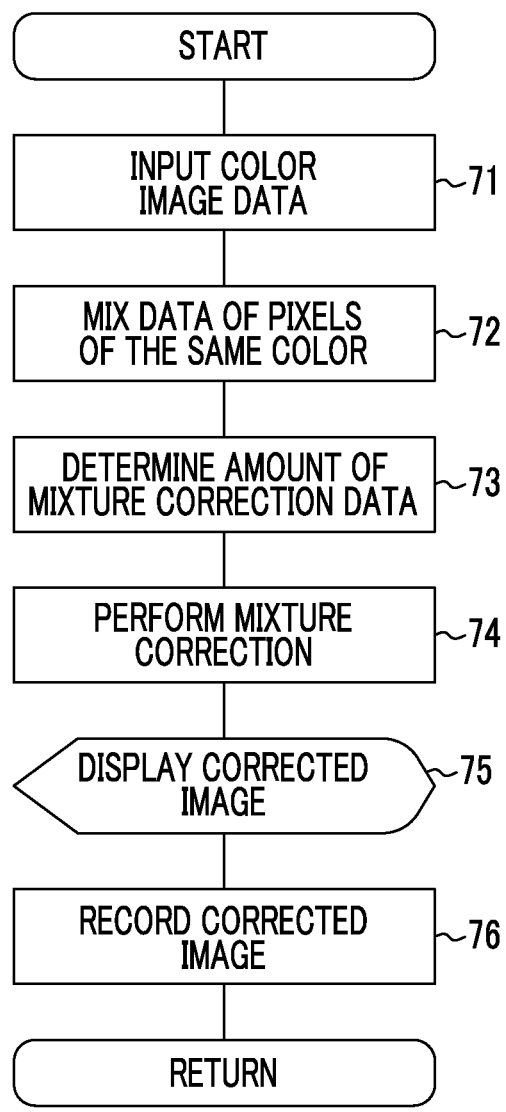
FIG. 32 is a flowchart illustrating the procedure of a mixture correction process.

FIGS. 31 and 32 illustrate another embodiment and are block diagrams illustrating the electrical structure of a personal computer.

A CPU 60 controls the overall operation of the personal computer.

A communication device 61, a memory 62, an input device 63, such as a keyboard, and a display device 64 are connected to the CPU 60. In addition, the personal computer includes a hard disk 68, a hard disk drive 67 that accesses the hard disk 68, and a compact disk-read only memory (CD-ROM) drive 65.

A CD-ROM 66 which stores a program for performing the above-mentioned mixture correction is inserted into a CD-ROM drive 65 and the program is read from the CD-ROM 66. The read program is installed in the personal computer and the above-mentioned process is performed. The program may not be stored in the CD-ROM 66. The communication device 61 may receive the program transmitted through a network and the program may be installed in the personal computer.

FIG. 32 is a flowchart illustrating the procedure of the process of the personal computer illustrated in FIG. 31.

As described above, color image data captured by the imaging device is recorded on the hard disk 68 and the color image data is read from the hard disk 68 (Step 71). In the read color image data, pixel mixture is performed for the data of pixels of the same color, as described above (Step 72). Then, as described above, mixture correction data for the mixed pixel is determined (Step 73) and mixture correction is performed (Step 74). This process is performed for all of the color image data indicating a color object image to obtain a mixture-corrected reduced color image. The obtained reduced color image is displayed on a display screen of the display device 64 (Step 75). Image data indicating the mixture-corrected reduced color image is recorded on the hard disk 68 (Step 76).

The digital camera and the personal computer have been described above as the embodiment of the imaging apparatus according to the invention. However, the structure of the imaging apparatus is not limited thereto. Other imaging apparatus according to the embodiments of the invention may be, for example, a built-in or external PC camera and a portable terminal device with an imaging function, which will be described below.

Examples of a portable terminal device, which is an embodiment of the imaging apparatus according to the invention, include a mobile phone, a smart phone, a personal digital assistant (PDA), and a portable game machine. Hereinafter, the smart phone will be described in detail as an example with reference to the drawings.

Figure 33:
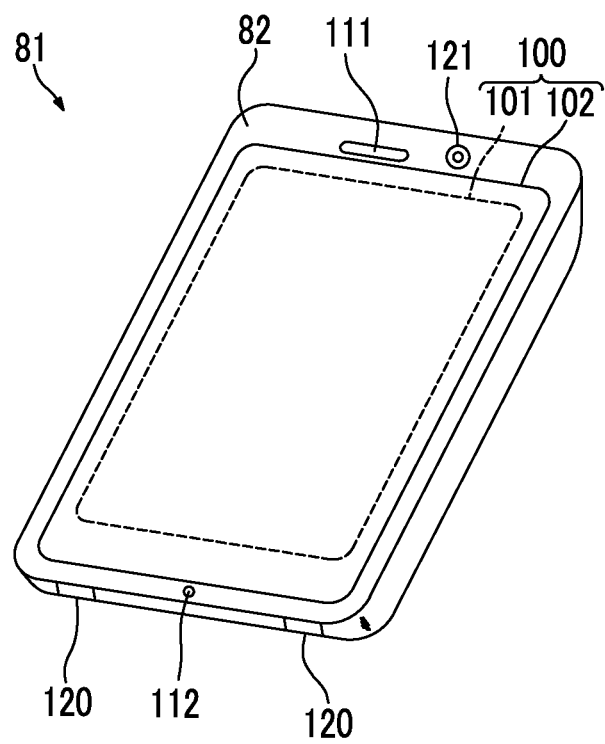
FIG. 33 is a diagram illustrating the outward appearance of a smart phone.

FIG. 33 illustrates the outward appearance of a smart phone 81 which is an embodiment of the imaging apparatus according to the invention. The smart phone 81 illustrated in FIG. 33 includes a housing 82 with a flat plate shape and a display input unit 100 having a display panel 101 as a display unit and an operation panel 102 as an input unit which are integrally formed on one surface of the housing 82. The housing 82 includes a microphone 112, a speaker 111, an operating unit 120, and a camera unit 121. However, the structure of the housing 82 is not limited thereto. For example, the display unit and the input unit may be independently provided or the housing 82 may have a folding structure or a sliding mechanism.

Figure 34:
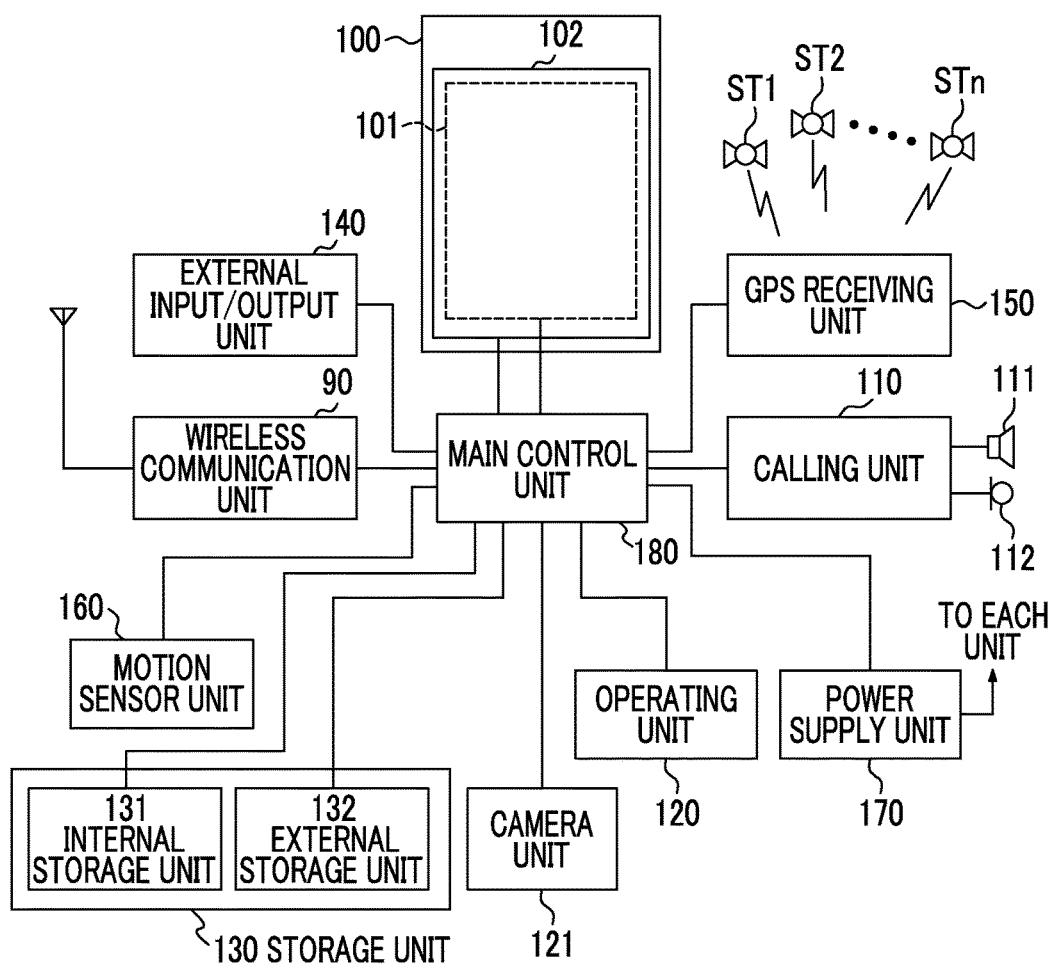
FIG. 34 is a block diagram illustrating the electrical structure of the smart phone.

FIG. 34 is a block diagram illustrating the structure of the smart phone 81 illustrated in FIG. 33. As illustrated in FIG. 34, the smart phone includes, as main components, a wireless communication unit 90, the display input unit 100, a calling unit 110, the operating unit 120, the camera unit 121, a storage unit 130, and an external input/output unit 140, a global positioning system (GPS) receiving unit 150, a motion sensor unit 160, a power supply unit 170, and a main control unit 180. The smart phone 81 has, as a main function, a wireless communication function which performs mobile wireless communication through a base station apparatus BS and a mobile communication network NW.

The wireless communication unit 90 performs wireless communication with the base station apparatus BS which is accommodated in the mobile communication network NW in response to an instruction from the main control unit 180. The wireless communication is used to transmit and receive various types of file data, such as voice data and image data, and electronic mail data or to receive, for example, web data and streaming data.

The display input unit 100 is a so-called touch panel which displays, for example, images (still images and moving images) or text information to visually transmit information to the user and detects a user operation for the displayed information under the control of the main control unit 180, and includes the display panel 101 and the operation panel 102.

The display panel 101 uses, for example, a liquid crystal display (LCD) or an organic electro-luminescence display (OELD) as a display device. The operation panel 102 is a device that is provided such that an image displayed on a display surface of the display panel 101 is visually recognized and detects one or a plurality of coordinates operated by a finger of the user or a stylus. When the device is operated by a finger of the user or a stylus, a detection signal which is generated by the operation is output to the main control unit 180. Then, the main control unit 180 detects an operation position (coordinates) on the display panel 101 on the basis of the received detection signal.

As illustrated in FIG. 33, the display panel 101 and the operation panel 102 of the smart phone 81, which is an embodiment of the imaging apparatus according to the invention, are integrated to form the display input unit 100 and the operation panel 102 is arranged so as to completely cover the display panel 101. When this arrangement is used, the operation panel 102 may have a function of detecting the user's operation in a region other than the display panel 101. In other words, the operation panel 102 may include a detection region (hereinafter, referred to as a display region) for an overlap portion which overlaps the display panel 101 and a detection region (hereinafter, referred to as a non-display region) for an outer edge portion which does not overlap the display panel 101.

The size of the display region may be exactly equal to the size of the display panel 101. However, the sizes are not necessarily equal to each other. The operation panel 102 may include two sensitive regions, that is, an outer edge portion and an inner portion other than the outer edge portion. The width of the outer edge portion is appropriately designed according to, for example, the size of the housing 82. Examples of a position detecting method which is used in the operation panel 102 include a matrix switching method, a resistive layer method, a surface elastic wave method, an infrared method, an electromagnetic induction method, and a capacitive sensing method. Any method may be used.

The calling unit 110 includes the speaker 111 and the microphone 112. The calling unit 110 converts the voice of the user which is input through the microphone 112 into voice data which can be processed by the main control unit 180 and outputs the converted voice data to the main control unit 180. In addition, the calling unit 110 decodes voice data received by the wireless communication unit 90 or the external input/output unit 140 and outputs the decoded voice data from the speaker 111. As illustrated in FIG. 33, for example, the speaker 111 can be mounted on the same surface as the display input unit 100 and the microphone 112 can be mounted on a side surface of the housing 82.

The operating unit 120 is a hardware key which uses, for example, a key switch and receives instructions from the user. For example, as illustrated in FIG. 33, the operating unit 120 is a push button switch which is mounted on the side surface of the housing 82 of the smart phone 81, is turned on when it is pressed by, for example, a finger, and is turned off by the restoring force of a spring when the finger is taken off.

The storage unit 130 stores a control program or control data of the main control unit 180, application software, address data which is associated with, for example, the names or phone numbers of communication partners, transmitted and received electronic mail data, web data which is downloaded by web browsing, or downloaded content data. In addition, the storage unit 130 temporally stores, for example, streaming data. The storage unit 130 includes an internal storage unit 131 which is provided in the smart phone and an external storage unit 132 which has a detachable external memory slot. The internal storage unit 131 and the external storage unit 132 forming the storage unit 130 may be implemented by a storage medium, such as a flash memory, a hard disk, a multimedia-card-micro-type memory, a card-type memory (for example, a MicroSD (registered trademark) memory), a random access memory (RAM), or a read only memory (ROM).

The external input/output unit 140 functions as an interface with all external apparatuses which are connected to the smart phone 81 and is directly or indirectly connected to other external apparatuses by communication (for example, universal serial bus (USB) communication and IEEE1394) or a network (for example, the Internet, a wireless LAN, a Bluetooth (registered trademark) network, a radio frequency identification (RFID) network, an infrared data association (IrDA (registered trademark)) network, an ultra wideband (UWB) (registered trademark) network, or a ZigBee (registered trademark) network).

Examples of the external apparatus connected to the smart phone 81 include a wired/wireless headset, a wired/wireless external charger a wired/wireless data port, and a memory card which is connected through a card socket, a subscriber identity module (SIM) card/user identity module (UIM) card, an external audio/video apparatus which is connected through an audio/video input/output (I/O) terminal, a wirelessly connected external audio/video apparatus, a smart phone which is connected wirelessly or in a wired manner, a personal computer which is connected wirelessly or in a wired manner, a PDA which is connected wirelessly or in a wired manner, and an earphone. The external input/output unit can transmit data which is received from the external apparatus to each component of the smart phone 81 or can transmit data in the smart phone 81 to the external apparatus.

The GPS receiving unit 150 receives GPS signals transmitted from GPS satellites ST1 to STn and performs a position measurement process on the basis of the received GPS signals to detect a position including the latitude, longitude, and height of the smart phone 81, in response to an instruction from the main control unit 180. When the GPS receiving unit 150 can acquire positional information from the wireless communication unit 90 or the external input/output unit 140 (for example, the wireless LAN), it can detect the position using the positional information.

The motion sensor unit 160 includes, for example, a triaxial acceleration sensor and detects the physical movement of the smart phone 81 in response to an instruction from the main control unit 180. The moving direction or acceleration of the smart phone 81 is detected by the detected physical movement of the smart phone 81. The detection result is output to the main control unit 180.

The power supply unit 170 supplies power which is stored in a battery (not illustrated) to each unit of the smart phone 81 in response to an instruction from the main control unit 180.

The main control unit 180 includes a microprocessor, operates on the basis of the control program or control data stored in the storage unit 130, and controls the overall operation of each unit of the smart phone 81. The main control unit 180 has an application processing function and a mobile communication control function of controlling each unit of a communication system in order to perform voice communication or data communication through the wireless communication unit 90.

The application processing function is implemented by the operation of the main control unit 180 based on the application software which is stored in the storage unit 130. Examples of the application processing function include an infrared communication function which controls the external input/output unit 140 such that data communication with an opposing apparatus is performed, an electronic mail function which transmits and receives electronic mail, and a web browsing function which browses web pages.

The main control unit 180 has, for example, an image processing function which displays an image on the display input unit 100 on the basis of image data (still image or moving image data) such as received data or downloaded streaming data. The image processing function means the function of the main control unit 180 decoding the image data, performing image processing on the decoding result, and displaying the image on the display input unit 100.

The main control unit 180 performs display control for the display panel 101 and operation detection control which detects the operation of the user through the operating unit 120 and the operation panel 102.

The main control unit 180 performs the display control to display a software key, such as an icon for starting application software or a scroll bar, or to display a window for creating electronic mail. The scroll bar means a software key for receiving an instruction to move a displayed portion of an image that is too large to fit into the display region of the display panel 101.

The main control unit 180 performs the operation detection control to detect the operation of the user input through the operating unit 120, to receive an operation for the icon or the input of a character string to an input field of the window through the operation panel 102, or to receive a request to scroll the displayed image through the scroll bar.

In addition, the main control unit 180 performs the operation detection control to determine whether the position of an operation for the operation panel 102 is an overlap portion (display region) which overlaps the display panel 101 or an outer edge portion (non-display region) which does not overlap the display panel 101 other than the overlap portion. The main control unit 180 has a touch panel control function which controls a sensitive region of the operation panel 102 or the display position of the software key.

The main control unit 180 can detect a gesture operation for the operation panel 102 and can perform a predetermined function according to the detected gesture operation. The gesture operation does not mean a simple touch operation of the related art, but means an operation which draws a trace using a finger, an operation which designates a plurality of positions at the same time, or a combination thereof which draws a trace for at least one of the plurality of positions.

The camera unit 121 is a digital camera which electronically captures an image using an imaging element, such as a complementary metal oxide semiconductor (CMOS) image sensor or a charge-coupled device (CCD). The camera unit 121 converts captured image data into image data which is compressed in, for example, a joint photographic coding experts group (JPEG) format under the control of the main control unit 180 and records the converted image data in the storage unit 130 or outputs the converted image data through the external input/output unit 140 or the wireless communication unit 90. As illustrated in FIG. 33, the camera unit 121 is mounted on the same surface as the display input unit 100 in the smart phone 81. However, the mounting position of the camera unit 121 is not limited thereto. For example, the camera unit 121 may be mounted on the rear surface of the display input unit 100 or a plurality of camera units 121 may be mounted. When the plurality of camera units 121 are mounted, the camera units 121 which are used to capture images may be switched such that a single camera unit captures images or the plurality of camera units 121 may be simultaneously used to capture images.

The camera unit 121 can be used for various functions of the smart phone 81. For example, the image captured by the camera unit 121 can be displayed on the display panel 101 or the image captured by the camera unit 121 can be used as one of the operation inputs of the operation panel 102. When the GPS receiving unit 150 detects the position, the position may be detected with reference to the image from the camera unit 121. In addition, the optical axis direction of the camera unit 121 in the smart phone 81 may be determined or the current usage environment may be determined, with reference to the image from the camera unit 121, using the triaxial acceleration sensor or without using the triaxial acceleration sensor. Of course, the image from the camera unit 121 may be used in the application software.

For example, various kinds of information, such as the positional information which is acquired by the GPS receiving unit 150, the voice information which is acquired by the microphone 112 (for example, the main control unit may convert the voice information into text information using voice-text conversion), and the posture information acquired by the motion sensor unit 160, may be added to the image data of a still image or a moving image and the image data may be stored in the storage unit 130 or may be output through the external input/output unit 140 or the wireless communication unit 90.

What is claimed is:

1. A color image data mixture correction device comprising:

a same-color pixel data mixture circuitry for mixing data of pixels of the same color which are included in a pixel block including a plurality of original pixels among a large number of original pixels forming a color image in color image data indicating the color image that is obtained by a single solid-state electronic imaging device, in which a plurality of photoelectric conversion elements having light receiving surfaces on which color filters with different filter characteristics are periodically formed in a repetitive pattern are arranged, to obtain reduced color image data; and a mixture correction circuitry for performing correction such that the amount of data mixed with the original pixels from the pixel which adjoins either among the up, down, left or right direction of the original pixels, and not pixels which adjoin from all of the up, down, left, and right directions, generating a mixed pixel is reduced from the amount of mixed pixel data which indicates each of a plurality of mixed pixels forming a reduced color image indicated by the reduced color image data obtained by said same-color pixel data mixture circuitry.

2. The color image data mixture correction device according to claim 1, wherein a size of the pixel block is different from a size defined by a repetitive pattern cycle of the color filters, and the amount of mixed data which is reduced from the amount of data of the mixed pixel varies depending on the color pattern of the original pixels generating the mixed pixel in the pixel block.

3. The color image data mixture correction device according to claim 1, wherein said same-color pixel data mixture circuitry repeatedly performs pixel mixture for each pixel block in the color image data, and an enlarged pixel block including 2×2 pixel blocks which are adjacent to each other in a horizontal direction and a vertical direction includes at least two pixel blocks having the same color filter array.

4. The color image data mixture correction device according to claim 1, wherein the color filters are formed on the light receiving surfaces of the photoelectric conversion elements in a Bayer array, and the pixel block includes only three pixels in the horizontal direction and only three pixels in the vertical direction.

5. The color image data mixture correction device according to claim 1, wherein at least one first filter with characteristics that transmit a green or magenta light component, at least one second filter with characteristics that transmit a red or cyan light component, and at least one third filter with characteristics that transmit a blue or yellow light component are formed in the horizontal direction and the vertical direction on the light receiving surfaces of 6×6 photoelectric conversion elements in the horizontal direction and the vertical direction, at least one first filter is formed in the horizontal direction, the vertical direction, and an oblique direction and two consecutive first filters are formed in at least one of the horizontal direction, the vertical direction, and the oblique direction, and the pixel block includes only three pixels in the horizontal direction and only three pixels in the vertical direction.

6. A method for controlling an operation of a color image data mixture correction device, comprising:

allowing a same-color pixel data mixture circuitry to mix data of pixels of the same color which are included in a pixel block including a plurality of original pixels among a large number of original pixels forming a color image in color image data indicating the color image that is obtained by a single solid-state electronic imaging device, in which a plurality of photoelectric conversion elements having light receiving surfaces on which color filters with different filter characteristics are periodically formed in a repetitive pattern are arranged, thereby obtaining reduced color image data; and allowing a mixture correction circuitry to perform correction such that the amount of data mixed with the original pixels from the pixel which adjoins either among the up, down, left or right direction of the original pixels, and not pixels which adjoin from all of the up, down, left, and right directions, generating a mixed pixel is reduced from the amount of mixed pixel data which indicates each of a plurality of mixed pixels forming a reduced color image indicated by the reduced color image data obtained by said same-color pixel data mixture circuitry.

7. A non-transitory recording medium storing a computer-readable program that controls a computer of a color image data mixture correction device so as to perform:

mixing data of pixels of the same color which are included in a pixel block including a plurality of original pixels among a large number of original pixels forming a color image in color image data indicating the color image that is obtained by a single solid-state electronic imaging device, in which a plurality of photoelectric conversion elements having light receiving surfaces on which color filters with different filter characteristics are periodically formed in a repetitive pattern are arranged, to obtain reduced color image data; and performing correction such that the amount of data mixed with the original pixels from the pixel which adjoins either among the up, down, left or right direction of the original pixels, and not pixels which adjoin from all of the up, down, left, and right directions, generating a mixed pixel is reduced from the amount of mixed pixel data which indicates each of a plurality of mixed pixels forming a reduced color image indicated by the obtained reduced color image data.

* * * * *